United States Patent
Hodzen et al.

(10) Patent No.: US 9,482,169 B2
(45) Date of Patent: Nov. 1, 2016

(54) OPTIMIZATION-BASED CONTROLS FOR DIESEL ENGINE AIR-HANDLING SYSTEMS

(71) Applicant: Cummins Inc., Columbus, IN (US)

(72) Inventors: Edmund P. Hodzen, Columbus, IN (US); Nassim Khaled, Columbus, IN (US); Phanindra Garamella, Bloomington, IN (US); Hoseinali Borhan, Bloomington, IN (US)

(73) Assignee: Cummins Inc., Columbus, IN (US)

( * ) Notice: Subject to any disclaimer, the term of this patent is extended or adjusted under 35 U.S.C. 154(b) by 296 days.

(21) Appl. No.: 14/338,970

(22) Filed: Jul. 23, 2014

(65) Prior Publication Data

US 2016/0025020 A1    Jan. 28, 2016

(51) Int. Cl.
  *F02D 41/00*  (2006.01)
  *F02D 41/14*  (2006.01)

(52) U.S. Cl.
  CPC ......... *F02D 41/0065* (2013.01); *F02D 41/005* (2013.01); *F02D 41/0007* (2013.01); *F02D 41/1406* (2013.01); *F02D 2041/001* (2013.01); *F02D 2041/1412* (2013.01); *F02D 2041/1433* (2013.01); *F02D 2200/0402* (2013.01); *Y02T 10/144* (2013.01); *Y02T 10/47* (2013.01)

(58) Field of Classification Search
  CPC .............. F02D 41/00; F02D 41/0007; F02D 2041/001; F02D 2041/1433; F02D 2200/0402; F02D 2200/0406
  See application file for complete search history.

(56) References Cited

U.S. PATENT DOCUMENTS

| | | | |
|---|---|---|---|
| 7,275,374 B2 | 10/2007 | Stewart et al. | |
| 7,281,518 B1 | 10/2007 | Allain et al. | |
| 7,328,074 B2 | 2/2008 | Das et al. | |
| 7,376,471 B2* | 5/2008 | Das | G05B 13/042 700/28 |
| 8,078,291 B2 | 12/2011 | Pekar et al. | |
| 8,103,427 B2 | 1/2012 | Osburn et al. | |
| 8,145,329 B2* | 3/2012 | Pekar | G05B 13/048 700/44 |
| 2001/0021900 A1* | 9/2001 | Kassmann | G05B 13/048 703/2 |
| 2005/0143952 A1* | 6/2005 | Tomoyasu | H01J 37/32935 702/181 |
| 2006/0137346 A1* | 6/2006 | Stewart | F02D 23/02 60/605.2 |
| 2008/0071397 A1* | 3/2008 | Rawlings | G05B 13/048 700/53 |

(Continued)

OTHER PUBLICATIONS

Henson, Michael A., Nonlinear Model Predictive Control:Current Status and Future Directions, Computers and Chemical Engineering, 1998, pp. 187-202, Copyright 1998 Published by Elsevier Ltd.

(Continued)

*Primary Examiner* — Erick Solis

(74) *Attorney, Agent, or Firm* — Taft Stettinius & Hollister LLP

(57) ABSTRACT

System, apparatus, and methods are disclosed for a computing a first set of parameters based on operational states of an internal combustion engine and an air handling system, a second set of parameters based on a linear time varying model, and one or more control commands based upon a minimization or maximization of a cost function over a prediction horizon, the second set of parameters, and at least one physical constraint of the internal combustion engine, and controlling one or more operations based at least in part upon the one or more control commands. The acts of determining the first and second set of parameters and computing the one or more control commands are repeated over a plurality of time periods over which the first set of parameters and the second set of parameters are time variant.

29 Claims, 3 Drawing Sheets

(56) References Cited

U.S. PATENT DOCUMENTS

2009/0088918 A1* 4/2009 Takenaka ............ B60T 8/17551
701/31.4
2009/0306866 A1 12/2009 Malikopoulos

OTHER PUBLICATIONS

Herceg, Martin et al., Nonlinear Model Predictive Control of a Turbocharged Diesel Engine, Computer Aided Control System Design, pp. 1-6, 2006 IEEE International Conference on Control Applications.

Stewart, Gregory et al., A Model Predictive Control Framework for Industrial Turbodiesel Engine Control, Dec. 9-11, 2008, pp. 5704-5711, 47th IEEE Conference on Decision and Control.

Jankovic, Mrdjan et. al., Constructive Lyapunov Control Design for Turborcharged Diesel Engines, Mar. 2, 2008, pp. 288-299, IEEE Transactions on Control Systems Technology, vol. 8, No. 2.

* cited by examiner

OPTIMIZATION-BASED CONTROLS FOR DIESEL ENGINE AIR-HANDLING SYSTEMS

BACKGROUND

The present application generally relates to optimization-based control methods and control systems for diesel engines including an air handling system, and more particularly to controlling air handling system actuators in such systems. For diesel engines, an insufficient amount of air may lead to an increase in particulate emissions, while an excess of air and low amount of recirculated exhaust gas may lead to an increase in NOx emissions. Present approaches to controls for such systems suffer from a number of limitations and shortcomings. Therefore, a need remains for further improvements in systems, apparatus, and methods for controlling air handling actuators.

SUMMARY

One embodiment is a unique system, method, and apparatus to control air handling actuators in air handling systems of a diesel engine. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
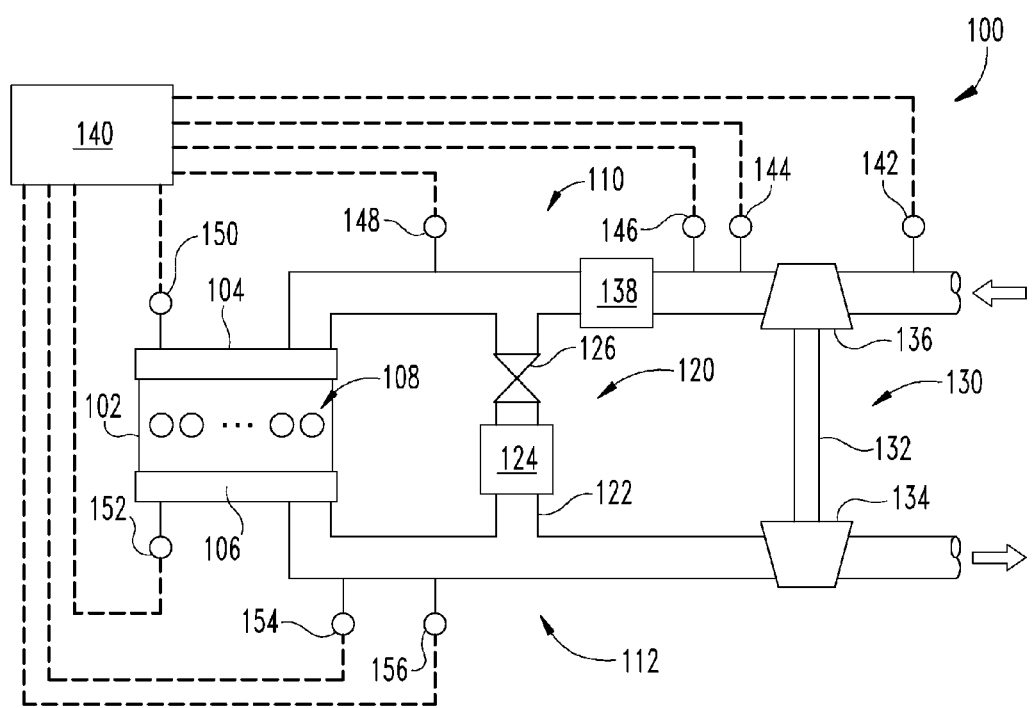
FIG. 1 is a schematic illustration of a system including an example engine and air handling system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated an air handling system 100 that includes an engine 102, such as an internal combustion engine, in fluid communication with an intake system 110 through which charge air enters an intake manifold 104 of the engine 102 and an exhaust system 112 through which exhaust gas resulting from combustion in engine 102 exits via an exhaust manifold 106 of the engine 102, it being understood that not all details of these systems that are typically present are shown. Engine 102 includes a number of cylinders 108 forming combustion chambers into which fuel is injected by fuel injectors (not shown) to combust with the charge air that has entered through the intake system 110 to the intake manifold 104. Intake valves (not shown) control the admission of charge air into the cylinders 108, and exhaust valves (not shown) control the outflow of exhaust gas through exhaust system 106 and ultimately to the atmosphere.

The air handling system 100 includes an exhaust gas recirculation (EGR) loop 120, including an EGR conduit 122 connecting the intake system 110 and the exhaust system 112, an EGR valve 126 for controlling the exhaust gas flow from the exhaust system 112 to the intake system 110, and a cooler 124 for cooling an intake manifold temperature. It is contemplated that in certain embodiments the cooler 124 may not be present.

The air handling system 100 further includes a turbocharger 130, such as a fixed geometry turbocharger including a wastegate or a variable geometry turbocharger (VGT), for example, operable to compress ambient air before the ambient air enters the intake manifold 104 of the engine 102 at increased pressure. The turbocharger 130 includes a shaft 132 connecting a turbine 134 connected to the exhaust system 112 and a compressor 154 connected to the intake system 110. The mixture of air from the compressor 136 and the exhaust gas from the EGR loop 120 is pumped through the intake system 110, to the intake manifold 104, and into the engine cylinders 108, typically producing torque on a crankshaft (not shown). The air handling system 100 further includes a charge after cooler (CAC) 138, operable to cool the charge flow provided to intake manifold 104. The air handling system 100 may also include various components not shown for connecting exhaust system 112 to intake system 110.

It shall be appreciated that the air handling system 100 is but one non-limiting illustrative embodiment of an air handling system to which the principles and techniques disclosed herein may be applied. A variety of alternate air handling system configurations and components may be utilized including, for example, air-handling systems with and without turbochargers or other types of superchargers. Exemplary forced induction systems may include one or more variable geometry turbochargers (VGTs), fixed geometry turbochargers, wastegated turbochargers, twin-turbochargers, series or parallel configurations of multiple turbochargers, symmetric or asymmetric combinations of turbochargers, and/or superchargers.

It shall be further appreciated that exemplary air handling systems may include charge air coolers with or without charge air cooler bypass valves, intake throttle valves, exhaust throttle valves, EGR valves, compressor bypass valves and/or as other types of air-handling actuators. A variety of EGR systems and configurations may be utilized including, for example, low pressure loop EGR, high pressure loop EGR, direct EGR, and/or EGR dedicated to one or more cylinders. Certain embodiments may include EGR loops with hot side EGR valves or cold side EGR valves. Certain embodiments may comprise systems including EGR bypass valves. Some embodiments may comprise non-EGR systems which omit EGR structure and functionality.

In the illustrated embodiment, the air handling system 100 includes a mass air flow (MAF) sensor 142, an ambient air temperature sensor 144, an ambient air pressure sensor 146, and an intake pressure sensor 148, each in fluid communication with the intake system 110. The air handling system 100 further includes an intake manifold pressure (IMAP) sensor 150 in fluid communication with the intake manifold 104. The intake system 110 and intake manifold 104 sensors need not be in direct communication with the intake system 110 or the intake manifold 104 and can be located at any position within the intake system 110 or the intake manifold 104 that provides a suitable indication of applicable intake system 110 and intake manifold 106 readings.

In one embodiment, the IMAP sensor 150, operative to sense the air pressure in the intake manifold 104, and the MAF sensor 142, operative to sense the flowrate of air entering the engine 102, can be utilized to calculate an EGR fraction. The EGR fraction provides an indication of the amount of EGR flow being supplied to the intake manifold 104 relative to the fresh air flow. However, any suitable method for determining the EGR fraction is contemplated.

The air handling system 100 further includes an oxygen sensor 154 and NOx sensor 156 in fluid communication with the exhaust system 112, and an exhaust manifold pressure sensor 152 in fluid communication with the exhaust manifold 106. The oxygen sensor 154 is operable to provide a measurement of the level or amount of oxygen in the exhaust gas from engine 102. The oxygen sensor 154 may be a true oxygen sensor, lambda sensor, or any type of sensor from which the oxygen level in the exhaust gas can be determined. The NOx sensor 156 is operable to provide a measurement of the amount or level of NOx in the exhaust gas from engine 102. Each of the oxygen sensor 154, the NOx sensor 156, and the exhaust manifold pressure sensor 152 need not be in direct communication with the exhaust system 112 or exhaust manifold 106, and can be located at any position within the exhaust system 112 or exhaust manifold 106 that provides a suitable indication of applicable exhaust system 112 or exhaust manifold 106 readings. In certain embodiments, the oxygen sensor 154 and NOx sensor 156 may be located upstream and/or downstream of an aftertreatment system (not shown) for NOx reduction. It is contemplated that in certain embodiments the $NO_x$ sensor 156 may additionally provide for oxygen detection.

It shall be appreciated that the foregoing sensors and sensor arrangements are but several non-limiting, illustrative embodiments of sensors and sensor systems to which the principles and techniques disclosed herein may be applied. A variety of other types of sensors and sensor configurations may be utilized including, EGR flow sensors, boost pressure sensors, and/or exhaust temperature sensors to name but a few examples. It shall further be appreciated that the sensors which are utilized may be physical sensors, virtual sensors and/or combinations thereof.

The air handling system 100 includes a controller 140 structured to perform certain operations to receive and interpret signals from any component and sensor of the air handling system 100. It shall be appreciated that the controller 140, or control module, may be provided in a variety of forms and configurations including one or more computing devices forming a whole or part of a processing subsystem having non-transitory memory storing computer executable instructions, processing, and communication hardware. The controller 140 may be a single device or a distributed device, and the functions of the controller 140 may be performed by hardware or software. The controller 140 is in communication with any actuators, sensors, datalinks, computing devices, wireless connections, or other devices to be able to perform any described operations.

The controller 140 includes stored data values, constants, and functions, as well as operating instructions stored on computer readable medium. Any of the operations of exemplary procedures described herein may be performed at least partially by the controller. Other groupings that execute similar overall operations are understood within the scope of the present application. Modules may be implemented in hardware and/or software on one or more computer readable media, and modules may be distributed across various hardware or software components. More specific descriptions of certain embodiments of controller operations are discussed herein in connection with FIG. 2. Operations illustrated are understood to be exemplary only, and operations may be combined or divided, and added or removed, as well as re-ordered in whole or in part.

Certain operations described herein include operations to interpret one or more parameters. Interpreting, as utilized herein, includes receiving values by any method, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

The controller 140 is operatively coupled with and structured to store instructions in memory which are readable and executable by the controller 140 to operate air and fuel handling control valves, such as the EGR control valve 126, for example. Other controllable actuators may include, for example, an intake throttle, an exhaust throttle, an inlet to the turbocharger 130, and a wastegate of the turbine 134.

Figure 2:
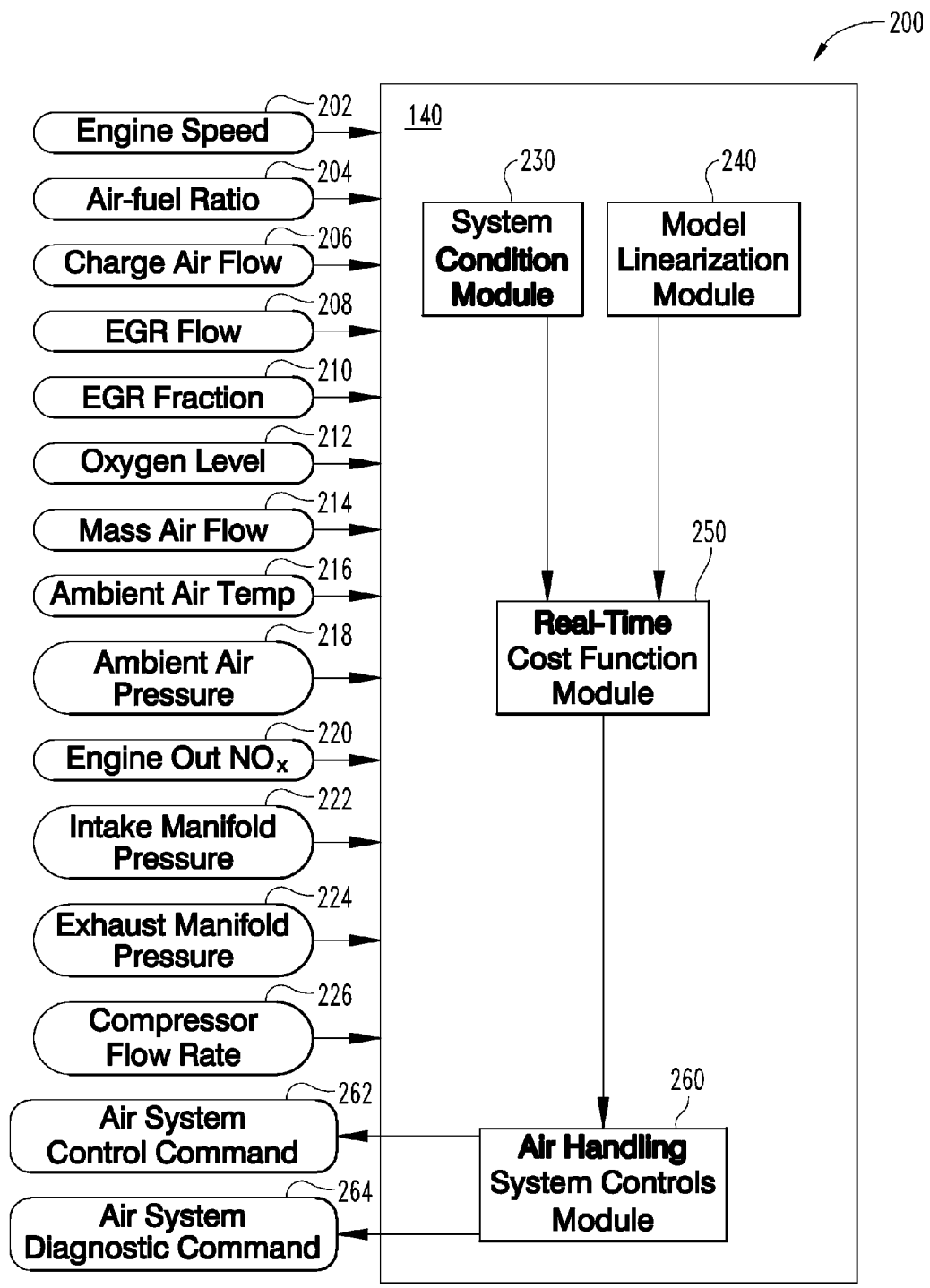
FIG. 2 is a diagram illustrating an example controller for controlling one or more actuators in an air handling system.

One example embodiment of controller 140 is shown in FIG. 2. The controller 140 includes a number of inputs representing received signals from various sensors associated with the air handling system 100 described in FIG. 1. In the illustrated embodiment, the controller 140 includes an engine speed input 202, an engine out air-fuel ratio (AFR) input 204, a charge air flow input 206, an EGR flow input 208, an EGR fraction input 210, an oxygen level input 212, a mass air flow input 214, an ambient air temperature input 216, an ambient air pressure input 218, an engine out NOx input 220, an intake manifold pressure input 222, an exhaust manifold pressure input 224, and a compressor flow rate input 226. It is contemplated that controller 140 inputs can come from sensors, virtual or real, and/or be calculated and/or estimated based on, for example, other sensors and/or engine operating conditions. It is further contemplated that the inputs described herein are exemplary only, and certain embodiments may contain fewer, additional and/or alternative inputs.

The illustrated controller 140 includes a system condition module 230, a model linearization module 240, a real-time cost function module 250, and an air handling system controls module 260. Other controller 140 arrangements that functionally execute the operations of the controller 140 are contemplated in the present application.

The system condition module 230 is structured to receive and interpret inputs to the controller 140. In an example embodiment, the system condition module 230 is further structured to determine operational state information based at least in part on the inputs received by the controller 140, and provide at least a portion of the operational state information to the model linearization module 240 and the real-time cost function module 250. The model linearization module 240 is structured to calculate a set of parameters for a linear time-varying model of the engine based on at least the portion of the operational state information received from system condition module 230 and a physical model of the engine over the space of operational states and controller 140 inputs. The model linearization module is further structured to provide the set of parameters to the real-time cost function module 250.

The real-time cost function module 250 is structured to receive and interpret the operational state information from the system condition module 230 and the set of parameters from the model linearization module 240. In an example embodiment, the real-time cost function module 250 is structured to run a cost function, tracking the set of parameters over a prediction horizon. The real-time cost function module 250 may determine a solution of the cost function in a number of manners including, for example minimizing the cost function, maximizing the cost function, determining incremental solutions, converging or iteratively approaching a minimization, a maximization or another value which is selected for convergence. It shall be appreciated that minimization and maximization need not be absolute and that values differing from the absolute theoretical or practical minimum or maximum of a given function may be utilized for minimization or maximization operations. The cost function may be minimized subject to the set of parameters from the linear model and at least one physical constraint of the engine. In certain embodiments, because the linear model may be reconfigurable as a function of the operational state information, the cost function may be minimized in real-time using fast quadratic programming methods, for example, while the engine is running, which could be continuous or at discrete points in time. It is contemplated that in certain embodiments the cost function may be maximized. The real-time cost function module 250 is further structured to provide one or more control commands to the air handling system controls module 260.

The air handling system controls module 260 is structured to receive and interpret the control command(s) from the real-time cost function module 250. In an example embodiment, the air handling system controls module 260 provides at least one of an air handling system control command 262 and an air handling system diagnostic command 264 over a control sampling period. It is contemplated that the air handling system control command 262 may include more than one command to manipulate one or more air handling actuators, including the EGR valve 126, the turbocharger 130, an exhaust valve, an intake valve, and/or any other air handling actuator that may be present in the air handling system. In an example embodiment, the air handling system control command 262 includes an EGR valve position command, a turbocharger geometry command, an exhaust valve position command, and an intake valve position command. It is contemplated that additional air handling system control command(s) 262 may be provided by the air handling system controls module 260 for manipulating air handling actuators not illustrated and/or described herein.

In certain embodiments, where the air handling system 100 is electrically connected an on-board diagnostic (OBD) output device (not shown), the air handling system diagnostic command 264 may be provided to the on-board diagnostic output device for displaying the results of a diagnostic test or a position of one or more of the air handling actuators. It should be appreciated that the OBD output device may be any suitable device for displaying a result of the OBD tests to a user, operator, service technician, or other party, and may include, but is not limited to, an indicator lamp, a gauge, a printer, a memory device, an audible alarm, a display device, and/or other suitable output device.

Figure 3:
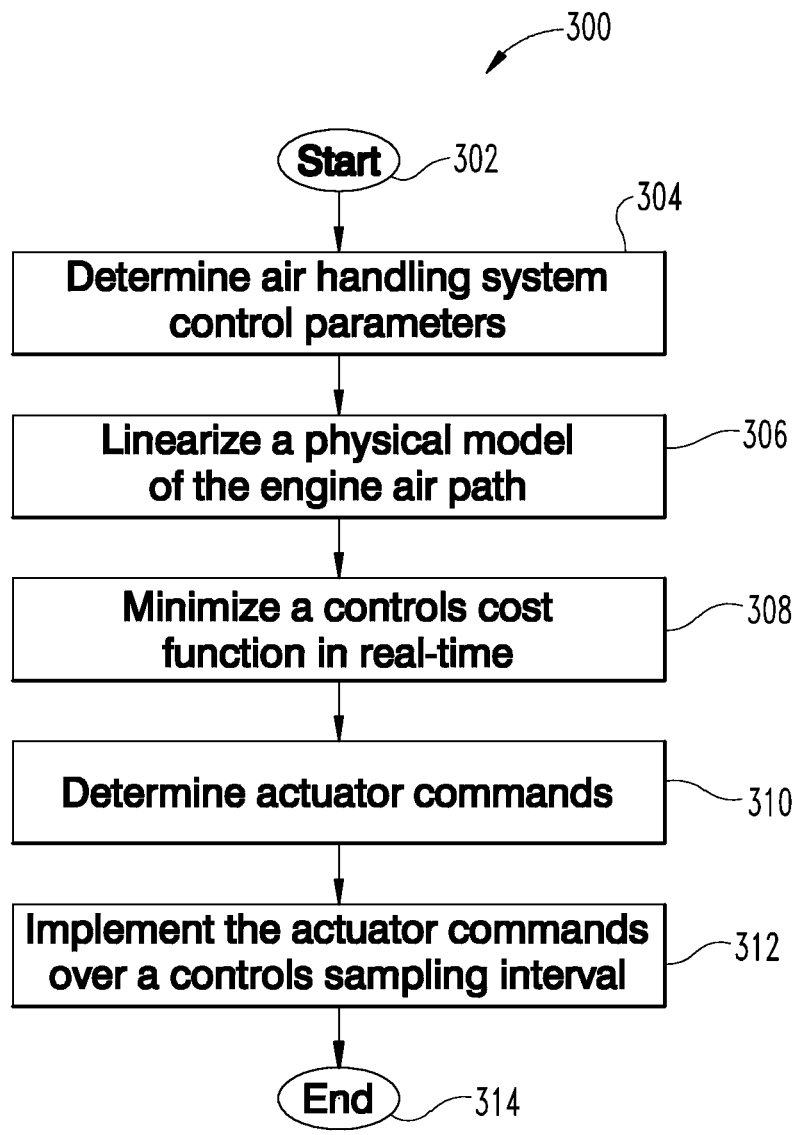
FIG. 3 is a flow diagram of a procedure that can be performed in conjunction with controlling one or more actuators in an air handling system.

The schematic flow diagram in FIG. 3 and related description which follows provides an illustrative embodiment of performing procedures for controlling engine emission variations. Operations illustrated are understood to be exemplary only, and operations may be combined or divided, and added or removed, as well as re-ordered in whole or part.

Certain operations illustrated may be implemented by a computer executing a computer program provided on a non-transitory computer readable storage medium, where the computer program comprises instructions causing the computer to execute one or more of the operations, or to issue commands to other devices to execute one or more of the operations.

With reference to FIG. 3, there is illustrated a flow diagram of an example procedure 300 for controlling air handling actuators that may be implemented in controller 140 for example. Procedure 300 begins at operation 302 which may begin by interpreting a key-on event and/or by initiation by an operator or technician. Operation 302 may alternatively or additionally include interpreting a communication or other parameter indicating that operation of a sampling interval is going to restart procedure 300 upon completion of procedure 300.

Procedure 300 continues from operation 302 to operation 304, where control parameters of the air handling system are determined based on current operational states of the air handling system 100 and set points of the engine 102 are calculated. In certain embodiments, the set points may include a desired AFR and/or an EGR fraction ratio. It should be appreciated that the air handling system control parameters may be measured and/or calculated. From operation 304, procedure 300 continues to operation 306, where a linear model of the air path is obtained by linearizing a physical model of the engine 102 as a function of the operational states.

Procedure 300 continues to operation 308, where a real-time calculation is performed to minimize a norm of error vector, by using a controls cost function, for example, between the control parameters and the set points based on the linear model over a finite prediction horizon subject to the linear model and physical constraints of the air handling system 100. In certain embodiments, the real-time calculation may be performed using a quadratic cost functional in discrete mode utilizing the equation:

$$J = \sum_{i=0}^{P-1} \|u(k+i) - u^d(k)\|_{R_i^u}^2 + \|\Delta u(k+i)\|_{R_i^{\Delta u}}^2 + \|y(k+i+1) - y^d(k+i+1)\|_{Q_i^y}^2 \quad \text{Equation 1}$$

wherein P is the size of the prediction window, i is the sample time, k is the current sample time, u is the actuator commands, $\Delta u$ is the change in the actuator commands, R is the weight factor for using actuators, $u^d$ is the set-points for the actuator commands, y is the tracking measured outputs of air handling system, $y^d$ is the desired set-point for the air handling system outputs, and Q is the weight factor for the output tracking errors from the corresponding set-points.

From operation 308, procedure 300 continues to operation 310, where actuator positions to set the position of the air handling system actuators are determined based on the calculation results from operation 308. The position of air handling system actuators may be set to regulate the AFR and the EGR fraction, for example.

Procedure 300 continues from operation 310 to operation 312, where actuator position commands to set the position of the air handling system actuators are determined based on the air handling system actuator positions determined in operation 308. In certain embodiments, the actuator position commands are implemented over a control sampling period of time in the framework of a model predictive control. In certain embodiments, the actuator position commands may include an exhaust valve position command, an intake valve position command, a turbocharger geometry command, and EGR valve position command. From operation 312, procedure 300 continues to operation 314, where procedure 300 ends. It is contemplated that in certain embodiments procedure 300 will be automatically repeated (i.e. restarts at operation 302) at a next control sampling time when procedure 300 ends.

One example according to the foregoing approach comprises implementing controls for an air-handling system including an exhaust gas recirculation (EGR) valve, variable geometry turbocharger (VGT) system, and intake air throttle (IAT). Respective actuators for these three system components are utilized to control EGR flow and Charge flow at multiple operating conditions and in transients. Controls for this system may be developed using the following steps. First, it is determined that that EGR flow and charge flow are the key variables to control for attaining system level objectives and that the three actuators are needed at different conditions. Second, data is then gathered empirically to help linearize the engine system at different operating conditions (speed and fueling). Third, a cost function is defined, for example, J=min (tracking error of EGR flow, Charge flow and movement of actuators). Fourth, based on the optimization function, the actuator commands are computed which also respects the physical constraints like peak cylinder pressure, turbo speed and, turbine inlet temperature. Fifth, the controller then sends commands to the actuators to move. The implementation is based on the rate of sampling time that is needed for the controller action. For example, every 20 ms a command would be sent to the actuators based on the calculations made over past 40 ms of time.

Various aspects of the systems, apparatus, and methods are disclosed herein. For example, one aspect involves a method that includes operating a system including an internal combustion engine and an air handling system, the air handling system including an exhaust system and an intake system, the intake system including a turbocharger structured to provide charge air to the internal combustion engine, determining a first set of parameters based on a set of operational states of the system, computing a second set of parameters based on a linear time varying model of the system as a function of the first set of parameters, computing one or more control commands based upon a minimization or maximization or other solution of a cost function over a prediction horizon, the second set of parameters, and at least one physical constraint of the internal combustion engine, and controlling one or more operations of the system based at least in part upon the one or more control commands. The acts of determining the first and second set of parameters and computing the one or more control commands are repeated over a plurality of time periods over which the first set of parameters and the second set of parameters are time variant.

In one embodiment of the method, determining the first set of parameters comprises at least one of measuring an operating condition of the system and estimating an operating condition of the system. In another embodiment, the set of operational states includes at least one of an air to fuel ratio, a mass air flow, an ambient air pressure, an EGR mass flow rate, a compressor mass flow rate, a turbine mass flow rate, a charge flow, an EGR fraction, an exhaust manifold pressure, an intake manifold temperature, and an intake manifold pressure.

In another embodiment, the act of controlling operation of the system comprises controlling the air handling system. In one refinement of the embodiment, the intake system further includes an EGR loop and an EGR valve structured to control exhaust flow through the EGR loop, and wherein controlling the air handling system includes controlling at least one of an EGR valve, a turbocharger valve, an exhaust valve, and an intake valve. In another refinement, the turbocharger is a variable geometry turbocharger and the intake system includes an EGR loop and an EGR valve structured to control exhaust flow through the EGR loop, wherein the determining comprises determining an air-fuel ratio and an EGR fraction, and wherein the controlling comprises controlling the EGR valve and/or controlling the geometry of the turbocharger.

In still another embodiment, the second set of parameters varying over time as a function of first set of parameters. In yet another embodiment, the act of second computing a control command comprises one of minimizing the norm of an error vector between predicted outputs and operating set points subject to physical constraints of the internal combustion engine, and computing a solution to a linear quadratic programming problem, computing a solution to a continuous optimization problem, or computing a solution to a combinatorial optimization problem.

Another aspect includes a system, including an internal combustion engine, an air handling system including an exhaust system and an intake system, the intake system including a turbocharger structured to provide charge air to the internal combustion engine, and a controller operatively coupled with the air handling system and the internal combustion engine. The controller is structured to perform the following operations during operation of the engine: determine operational state information of the air handling system, determine a set of parameters of a linear time varying model of the air handling system as a function of the operational state information, determine a control command based upon a minimization or maximization or other solution of a cost function over a prediction horizon, the computed set of parameters, and at least one physical constraint of the internal combustion engine, and control operation of the air handling system based at least in part upon the control command.

In one embodiment of the system, the controller is further structured to determine the control command over a control sampling period. In one refinement of the embodiment, the controller is further structured to repeat determining the control command over a plurality of control sampling periods over which the operational state information is determined and the set of parameters is determined over the prediction horizon. In a further refinement, controlling the intake system includes controlling at least one of an EGR valve, a turbocharger, an exhaust valve, and an intake valve. In still a further refinement, the intake system further includes an EGR loop and an EGR valve structured to control exhaust flow through the EGR loop, and wherein controlling the intake system further includes controlling an EGR valve.

In another embodiment of the system, the turbocharger is a variable geometry turbocharger and the intake system includes an EGR loop and an EGR valve structured to control exhaust flow through the EGR loop, wherein the set of parameters includes an air-fuel ratio and an EGR fraction, and wherein the controller is further structured to control the EGR valve and/or controlling the geometry of the turbocharger. In still another embodiment, the act of determining the control command comprises minimizing the norm of an error vector between predicted outputs and operating set points subject to physical constraints of the internal combustion engine. In yet another embodiment, the act of determining the control command comprises computing a solution to a linear quadratic programming problem, computing a solution to a continuous optimization problem, or computing a solution to a combinatorial optimization problem.

Still another aspect includes an apparatus, including an electronic controller in operative communication with a plurality of sensors operable to provide signals indicating conditions of a system, the system including an engine and an air handling system operationally coupled to the engine, the air handling system including an exhaust system and an intake system each operationally coupled to the engine, the intake system including a turbocharger structured to provide charge air to the internal combustion engine. The electronic controller includes: a real-time system condition module structured to determine operational state information of the system based upon the signals provided by the plurality of sensors, a real-time model computation module structured to compute a set of parameters of a linear time varying model of the system, the set of parameters varying over time as a function of the operational state information, a real-time cost function module structured to compute a control command in real-time based upon a minimization or maximization or other solution of a cost function over a prediction horizon, the computed set of parameters, and at least one physical constraint of the engine, and an air handling system controls module structured to provide at least one of an air handling system control command and an air handling system diagnostic command based on the control command.

In one embodiment of the apparatus, the at least one of the air handling system control command and the air handling system diagnostic command comprises at least one of the commands selected from the commands consisting of: an exhaust valve position command; an intake valve position command; and a turbocharger geometry command. In a refinement of the embodiment, the exhaust system includes an exhaust gas recirculation (EGR) loop including an EGR valve, wherein the at least one of the air handling system control command and the air handling system diagnostic command further comprises an EGR valve position command. In a further refinement, the set of parameters includes an air-fuel ratio and an EGR fraction.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   operating a system including an internal combustion engine and an air handling system, the air handling system including an exhaust system and an intake system, the intake system structured to provide charge air to the internal combustion engine;
   determining a first set of parameters based on a set of operational states of the system including a charge flow;
   computing a second set of parameters based on a linear time varying model of the system as a function of the first set of parameters;
   computing one or more control commands based upon a minimization or maximization of a cost function over a prediction horizon, and the second set of parameters; and
   controlling one or more operations of the air handling system based at least in part upon the one or more control commands;
   wherein the acts of determining the first and second set of parameters and computing the one or more control commands are repeated over a plurality of time periods over which the first set of parameters and the second set of parameters are time variant.

2. The method of claim 1, wherein the set of operational states of the system includes an exhaust manifold pressure.

3. The method of claim 1, wherein the act of computing one or more control commands comprises minimizing the norm of an error vector between predicted outputs and operating set points subject to physical constraints of the internal combustion engine, computing a solution to a linear quadratic programming problem, computing a solution to a continuous optimization problem, or computing a solution to a combinatorial optimization problem.

4. The method of claim 1, wherein the second set of parameters vary over time as a function of the first set of parameters.

5. The method of claim 1, wherein the act of second computing a control command comprises minimizing the norm of an error vector between predicted outputs and operating set points subject to physical constraints of the internal combustion engine.

6. The method of claim 1 wherein the computing one or more control commands based upon at least one physical constraint of the internal combustion engine in addition to the minimization or maximization of the cost function over the prediction horizon, and the second set of parameters.

7. A method comprising:
   operating a system including an internal combustion engine and an air handling system, the air handling system including an exhaust system and an intake system, the intake system structured to provide charge air to the internal combustion engine;
   determining a first set of parameters based on a set of operational states of the system;
   computing a second set of parameters based on a linear time varying model of the system as a function of the first set of parameters;
   computing one or more control commands based upon a solution of a cost function over a prediction horizon, and the second set of parameters; and
   controlling one or more operations of the system based at least in part upon the one or more control commands;
   wherein the acts of determining the first and second set of parameters and computing the one or more control commands are repeated over a plurality of time periods over which the first set of parameters and the second set of parameters are time variant.

8. The method of claim 7, wherein determining the first set of parameters comprises at least one of measuring an operating condition of the system and estimating an operating condition of the system.

9. The method of claim 7, wherein the set of operational states includes at least one of an air to fuel ratio, a mass air flow, an ambient air pressure, an EGR mass flow rate, a compressor mass flow rate, a turbine mass flow rate, a charge flow, an EGR fraction, an exhaust manifold pressure, an intake manifold temperature, an intake manifold pressure, and an engine-out NOx state.

10. The method of claim 7, wherein the act of controlling operation of the system comprises controlling the air handling system.

11. The method of claim 10, wherein the intake system further includes at least one EGR loop and an EGR valve structured to control exhaust flow through the EGR loop, and wherein controlling the air handling system includes controlling at least one of an EGR valve, a turbocharger valve, an exhaust valve, and an intake valve.

12. The method of claim 10, wherein the intake system includes a variable geometry turbocharger, an EGR loop and an EGR valve structured to control exhaust flow through the EGR loop, wherein the determining the first set of parameters comprises determining an air-fuel ratio and an EGR fraction, and wherein the controlling one or more operations of the system comprises controlling the EGR valve and/or controlling the geometry of the turbocharger.

13. The method of claim 7, wherein the second set of parameters vary over time as a function of the first set of parameters.

14. The method of claim 7, wherein the act of one or more control commands comprises one of minimizing the norm of an error vector between predicted outputs and operating set points subject to physical constraints of the internal combustion engine, computing a solution to a linear quadratic programming problem, computing a solution to a continuous optimization problem, and computing a solution to a combinatorial optimization problem.

15. The method of claim 7 wherein the computing one or more control commands based upon at least one physical constraint of the internal combustion engine in addition to the minimization or maximization of the cost function over the prediction horizon, and the second set of parameters.

16. A system, comprising:
an internal combustion engine;
an air handling system including an exhaust system and an intake system, the intake system structured to provide charge air to the internal combustion engine; and
a controller operatively coupled with the air handling system and the internal combustion engine;
wherein the controller is structured to perform the following operations during operation of the engine:
determine operational state information of the air handling system,
determine a set of parameters of a linear time varying model of the air handling system as a function of the operational state information,
determine a control command based upon a solution of a cost function over a prediction horizon, and the computed set of parameters, and
control operation of the air handling system based at least in part upon the control command.

17. The system of claim 16, wherein the controller is further structured to determine the control command over a control sampling period.

18. The system of claim 17, wherein the controller is further structured to repeat determining the control command over a plurality of control sampling periods over which the operational state information is determined and the set of parameters is determined over the prediction horizon.

19. The system of claim 18, wherein controlling the intake system includes controlling at least one of an EGR valve, a turbocharger, an exhaust valve, and an intake valve.

20. The system of claim 19, wherein the intake system further includes an EGR loop and an EGR valve structured to control exhaust flow through the EGR loop, and wherein controlling the intake system further includes controlling an EGR valve.

21. The system of claim 16, wherein the intake system includes a variable geometry turbocharger, an EGR loop, and an EGR valve structured to control exhaust flow through the EGR loop, wherein the set of parameters includes an air-fuel ratio and an EGR fraction, and wherein the controller is further structured to control the EGR valve and/or controlling the geometry of the turbocharger.

22. The system of claim 16, wherein the act of determining the control command comprises minimizing the norm of an error vector between predicted outputs and operating set points subject to physical constraints of the internal combustion engine.

23. The system of claim 16, wherein the act of determining the control command comprises computing a solution to a linear quadratic programming problem, computing a solution to a continuous optimization problem, or computing a solution to a combinatorial optimization problem.

24. The system of claim 16 wherein the controller is structured to determine the control command based upon the minimization or maximization of the cost function over the prediction horizon, the computed set of parameters, and at least one physical constraint of the internal combustion engine.

25. An apparatus, comprising:
an electronic controller in operative communication with a plurality of sensors operable to provide signals indicating conditions of a system, the system including an engine and an air handling system operationally coupled to the engine, the air handling system including an exhaust system and an intake system, each operationally coupled to the engine, the intake system structured to provide charge air to the internal combustion engine, wherein the electronic controller includes:
a real-time system condition module structured to determine operational state information of the system based upon the signals provided by the plurality of sensors;
a real-time model computation module structured to compute a set of parameters of a linear time varying model of the system, the set of parameters varying over time as a function of the operational state information;
a real-time cost function module structured to compute a control command in real-time based upon a minimization or maximization of a cost function over a prediction horizon, the computed set of parameters; and
an air handling system controls module structured to provide at least one of an air handling system control command and an air handling system diagnostic command based on the control command.

26. The apparatus of claim 25, wherein the at least one of the air handling system control command and the air handling system diagnostic command comprises at least one of the commands selected from the commands consisting of an exhaust valve position command, an intake valve position command, and a turbocharger geometry command.

27. The apparatus of claim 26, wherein the exhaust system includes an exhaust gas recirculation (EGR) loop including an EGR valve, wherein the at least one of the air handling system control command and the air handling system diagnostic command further comprises an EGR valve position command.

28. The apparatus of claim 27, wherein the set of parameters includes an air-fuel ratio and an EGR fraction.

29. The apparatus of claim 25 wherein the real-time cost function module is structured to compute the control command in real-time further at least one physical constraint of the engine.

* * * * *